United States Patent Office 3,378,071
Patented Apr. 16, 1968

3,378,071
METHOD FOR CONSOLIDATING INCOMPETENT SUBTERRANEAN FORMATIONS
Derry D. Sparlin, Ponca City, Okla., assignor to Continental Oil Company, Ponca City, Okla., a corporation of Delaware
No Drawing. Filed Feb. 10, 1966, Ser. No. 526,376
10 Claims. (Cl. 166—33)

ABSTRACT OF THE DISCLOSURE

This invention relates to a process for consolidating incompetent formation wherein there are zones of relatively high permeability which utilizes a slurry including particulate material and an adhesive and has primary utility in such formations. In one aspect, this invention envisions a process wherein a relatively limited amount of the slurry is pumped down a borehole into contact with the formation to be consolidated and thereafter a catalyst solution is placed in contact with the adhesive material in the slurry to flash set it. Another quantity of slurry is then positioned against the formation immediately adjacent the portion of the slurry which was flash set as a result of the initial operations in the borehole.

---

This invention relates to a method for the prevention of entrainment of formation particles in fluids produced from loose or incompetent subterranean formations through a well bore. More particularly, the invention relates to improvements in methods for the prevention of the production of formation particles from loose or incompetent formations, which methods employ a resin-coated particulate material in a plurality of placement steps.

In the production of subterranean fluids, such as oil, gas, water, etc., a number of difficulties are encountered when the well by which the fluids are produced penetrates a loose or unconsolidated subterranean formation. Such formations frequently are composed of loose water or oil sands, and the grains of the sand become entrained in the fluid being produced and are carried into the well bore. The result of such entrainment, among other things, is the abrasion of the pumping equipment in the well bore, the clogging of strainers, and the sanding in of the cavity immediately adjacent the strainer. These results in turn ultimately cause a sharp decrease in the rate of production and high maintenance costs.

In an effffort to reduce the deleterious results generally associated with producing fluids from an unconsolidated formation, it has heretofore been proposed to place plastic-coated particulated materials in contact with the face of the incompetent formation to form a relatively permeable plug through which formation particles which would otherwise be produced are strained out. For instance, it has sometimes been found of some advantage to coat particulated walnut hulls with a phenolformaldehyde resin binder and to utilize these materials in forming the relatively permeable plug. Similarly, it has been discovered that the utilization of sand for this purpose in combination with a chemical system comprising an age-hardenable resin composition and a coupling agent will produce a permeable plug having greatly enhanced properties, see, for instance, U.S. patent application 200,310, filed June 6, 1962, by Walther et al., entitled "Method for Consolidating Material," now U.S. Patent No. 3,282,338.

Unfortunately, however, in spite of recent innovations which have made the permeable plug an attractive feature in well completion, processes of this type still present a number of difficulties. Among the major difficulties which have been encountered in placing a slurry of resin-coated particulated material against the face of incompetent formations is the necessity for pumping away relatively large quantities of the resin-solid slurry when areas of relatively high permeability are encountered. For instance, it has been found that when a fracture zone is encountered in the incompetent formation, the tendency is for the plastic-coated particulated matter to follow the path of least resistance which, in such case, will be the fractured zone. This results in the necessity for pumping large quantities of the particulated matter into the fracture before the zones around the fracture receive any consolidating material. Similarly, in cases wherein the cementing job between the casing and the injection well is imperfect, there occurs a channel through which the nacient plastic-coated particles are channeled away from the face of the incompetent formation. Under these circumstances, it is necessary to inject unnecessarily large quantities of material in order to achieve a reasonable particle barrier.

Similar problems are encountered when the formation itself is extremely unconsolidated and therefore, in a sense, fluid. Under these circumstances when the particulated material is pumped into contact with the formation, the formation moves outwardly with the flow of the injected particulated material until it becomes sufficiently compacted to resist further outward flow of the injected slurry. Consequently, it is necessary to fill relatively large areas of such fluid formations with slurry material before a satisfactory barrier can be set up around the well bore. Until the present time, an economical and practical technique utilizing cemented particulated materials to form a solids barrier around a bore hole in an incompetent formation of a fluid consistency or wherein zones of relatively high permeability are encountered has remained an elusive desideratum.

Generally stated, one method of practicing the present invention involves the step of first mixing particulated material such as siliceous sand, an age-hardenable resinous composition, and, in a preferred embodiment, a coupling agent together with a carrier material to form a slurry. A first portion of the slurry is then placed in contact with a portion of a formation to be consolidated and at least a portion of the positioned slurry is then contacted with a catalyst to flash set the contacted portion. Subsequently, other parts of the total amount of the slurry are pumped out of the casing into contact with the face of the formation and these other parts are similarly flash set by means of a catalyst solution, which is injected following each such portion.

From the foregoing general description, it will be apparent that it is a major object of the present invention to improve presently used processes for preventing the production of solids from incompetent formations.

It is a more specific object of the invention to improve the methods now in use for preventing the production of sand from unconsolidated formations from which a fluid is being produced, which methods utilize plastic-coated particulated material.

Another object of the invention is to reduce the amount of materials needed in forming artificial solids barriers opposite the face of porous, fluid-producing formations.

Another object of the invention is to provide an improved practical process for preventing the production of sand from incompetent subterranean formations, which process is sufficiently simple in nature to permit it to be practiced relying largely upon consolidating techniques heretofore known and appreciated.

A further object of this invention is to provide a practical process for preventing the production of sand from incompetent subterranean formations wherein a relatively small amount of material is utilized.

THE PROCESS

One method of practicing the process of the present invention to achieve the foregoing objects entails an initial step of cleaning out such unwanted fluid materials as may be situated in the well. This cleaning out may comprise the steps of first circulating a quantity of water in the well until the returns of the circulated water are relatively clear and then circulating oil to displace the water while maintaining the tubing in a position at or near the bottom of the rathole. Additionally if the rathole is much more than 10 feet long it should be filled with gravel or other material prior to the cleaning out of the well. After the oil has been circulated and the water displaced into the formation from the well, the tubing is raised to a position usually from about 30 to about 50 feet above the perforations while pressure is maintained on the formation at a level from about 50 to about 100 p.s.i. above formation pressure. At this point an upper packer is set to seal off the interval to be treated from the upper sections of the geologic column and approximately two barrels of oil are injected into the formation to determine the injection pressure.

The next step in the process is the preparation of the slurry in an amount equal to from about ½ to about 25 barrels per vertical foot of formation to be treated, and preferably from about 1 to about 10 barrels. For this purpose it has been found advantageous to provide a container of from about 500 to about 2500 gallons capacity in which to mix the slurry, which container should provide means for maintaining the constituents of the slurry in constant agitation to keep the solid portions of the slurry in suspension. Commonly, a concrete mixer may be utilized for this purpose. Once the container is located at the proper position with relation to the wellhead, a quantity of carrier fluid is first added to it. Subsequently, agitation of the fluid is started and a quantity of particulated material such as sand is added to the carrier fluid, followed by an effective amount of coupling agent. Resin and catalyst are next added to the mixture while maintaining it in agitation, after which the mixture is agitated for approximately 10 minutes to insure proper coating of the sand.

After the slurry has been thoroughly mixed and while the sand is still in suspension, the slurry is pumped away, in stages, usually at the rate of approximately 2 barrels per minute or less.

In prior art consolidating processes, injection of the slurry is continued until an abrupt rise in injection pressure is observed, i.e. until sandout, or until such time as the rearward portion of the slurry material is located not less than about 20 feet (preferably from about 20 to about 30 feet) above the top of the perforations. Injection of the slurry is thereupon terminated and the well is shut in for approximately 24 hours during which time the slurry sets up into a hard, permeable mass. Subsequently, the portion of the set slurry within the casing is drilled out and the well is put back on production.

According to the present invention, the initial injection is terminated prior to pressure buildup. Accordingly, a fractional portion of the slurry is injected and flash set before the remaining portion or portions are pumped away. Usually, the initial portion of the slurry is from about ⅓ to about ¹⁄₁₀ of the total slurry volume although different fractional portions may be utilized. Moreover, it is not necessary for the various portions to be equal; for example, it is quite feasible to utilize an initial ⅓ fraction for the first stage of the process, followed by 4, 5, or 6 additional portions of the slurry which may or may not be equal to themselves.

After the initial fractional portion of the slurry is pumped into the tubing, a volume of buffer solution equal to from about one half barrel to not more than the volume of the tubing and preferably from about 2 to 3 barrels, is pumped into the well. A slug of catalyst solution containing a sufficiently high concentration of catalyst to set the resin with which it comes into contact in from about 5 to about 20 minutes is then pumped away. This catalyst solution is followed by an additional slug or buffer of sufficient size to completely displace the catalyst from the casing. The well is then shut in with the pressure maintained at a level to prevent any further movement of material at the face of the formation for a sufficient length of time, usually about 15 minutes, to allow the catalyst to diffuse through the buffer and contact a portion of the slurry which thereupon sets rapidly. Subsequently, another fractional portion of the plastic-coated sand slurry is injected.

In applying the second and subsequent portions of the plastic-coated sand slurry, the procedure outlined for the first portion is repeated until sandout or until the rearward part of the last portion is located in the casing from about 20 to 30 feet above the top perforation. At this time the well is shut in and pressure from about 50 to about 500 p.s.i. above formation pressure is maintained on the formation for approximately 24 hours to allow hardening of all the portions of the plastic-coated sand which have not been flash set by contact with the catalyst.

MODIFIED PROCESS STEPS

In the above general description of one possible method for practicing the present invention, it has been assumed that the bottom-hole pressure is sufficient to support a column of liquid in the bore hole; however, as is well known, such a condition is not always encountered in actual field operations. More particularly, it is not uncommon for the formation pressure encountered down hole to be less than the pressure exerted by the hydrostatic column of fluid in the bore hole. Under these circumstances a slightly modified procedure is necessitated; for instance, since the bottom-hole pressure will not support the column of liquid, it is necessary to utilize other means for cleaning out the bore hole prior to the plastic-coated particulated material treatment. This may be accomplished in a variety of ways, and of these perhaps the most common will be through the utilization of a sand pump which in essence is an apparatus at the end of a wire line for bailing out the material located in the bore hole.

In addition it will be noted that in the above description it was indicated that a column of fluid would be retained in the bore hole during those periods when the previously placed slurry is setting either due to the action of the catalyst solution or in the final set wherein the slurry is allowed to set under the action of the catalyst included in the slurry mix. When insufficient bottom-hole pressure is encountered, such a column of fluid cannot, of course, be maintained during these times; and consequently, it is necessary for the amount of fluid maintained in the hole after introduction of the slurry to be reduced to that amount which the bottom-hole presusre will safely support. This amount of fluid can be determined from observations of the bottom-hole pressure plus the knowledge of the specific gravity of the fluid involved.

While the above description has been presented as using sand, it is important to note that as used herein the term "particulated matter" is not so limited. In carrying out the invention, various particulated solids may be used: for example, fragmented nut shells, solid plastics, gilsonite, crushed coke, non-silicious sand, and the like.

MATERIALS AND RATIOS

In general, silicious sand is the preferred solid for use in preparing the slurry, and with such sand it is preferred to use a coupling agent which may be defined as a chemical agent having a molecular structure which is (a) characterized by having a first functional group located at an exposed position in the molecule for reacting with the resinous material which is used for consolidating the formation, and (b) is further characterized in having a second functional group, or an atom, located at a second exposed location in the molecule for establishing a chemical bond with the granular material of the formation. The coupling agent thus provides a strong chemical bridge linking the molecules of the consolidating resinous materials to the grains of material in the formation.

Coupling agents of the general type described include, but are not limited to, Werner-type co-ordination compounds consisting of transistion metal salt complexes of alpha, beta unsaturated acyclic carboxylic acids, particularly the cobalt, chromium, zinc, and nickel complexes, and organo-functional silanes, such as γ-aminopropyltriethoxysilane, and δ-aminobutylmethyldiethoxysilane. Other specific examples of these and other types of suitable compounds may be obtained in the discussion of coupling agents which appears in U.S. patent application 200,310, filed June 6, 1962, by Walther, et al. and entitled "Method for Consolidating Material."

In preparing the slurry there is no criticality attached to the order in which the slurry components are added together, except that the catalyst and resin should not be brought together until after the sand has been added to the mixture. Ordinarily, when coupling agent is used, it will be most convenient to add the coupling agent directly to the resin mixture. However, satisfactory results will also be obtained when the coupling agent is added to the sand alone or to a sand-resin mixture slurry.

Insofar as the addition of the catalyst is concerned, it likewise may be added at various stages in the preparation of the slurry. As pointed out above, it is extremely important that the catalyst and resin not be brought together in the absence of the sand since the reaction that would take place under such circumstances would be extremely rapid and under improper conditions could cause an explosion. Ordinarily it will be preferred to add the catalyst immediately prior to pumping away the slurry as disclosed in the above specific description of the process.

In a preferred aspect, the invention is practiced utilizing a sand-phenolformaldehyde resin-coupling agent slurry in a carrier liquid.

In general the range of satisfactory ratios between the coupling agent and resin will be from about 0.005 percent to about 10 percent by weight of the coupling agent to the total coupling agent-resin mixture. Similarly, the sand-resin ratio is not critical; it only being necessary that there be sufficient resin to substantially coat the sand particles and not so much resin as to form an impermeable mass when the slurry has set. In general from about one to about 50 bulk unit volumes of particulated material per unit volume of resin material will be found satisfactory, with a preferred range of from about 2 to about 10, although either more or less particulated material may be used per volume of resin material without unduly limiting the efficacy of the technique. The resin material will ordinarily be in a suitable solvent of which many are well known in the art; for example, ethyl alcohol and furfuryl alcohol, may, depending upon the resin, be utilized for this purpose. While the concentration of the resin solution is not critical, generally the solution will contain at least about 5% and preferably at least about 33% resin material when a solvent is used.

Generally the ratio between the coated particulated material and carrier is not critical although it will ordinarily be in the range of from about 0.1 to about 25 pounds of sand per gallon of carrier with a preferred range of from about 10 to about 15 pounds per gallon.

The preferred range of sizes for the particulated material is from about 20 to about 60 mesh. Sizes outside this range are allowable, however; and in general, particulated material as large as 4 mesh and as small as 200 mesh may be utilized.

A number of materials, either acidic or basic, all of them well known in the art, may be utilized for the catalyst used directly in the slurry. For instance, sodium hydroxide, trichloroacetic acid, hydrochloric acid, sulfuric acid, hypophosphorous acid, phosphoric acid, acetic acid, alkylbenzene sulphonic acid, diethylenetriamine, triethylenetetramine, piperidine, and phthalic anhydride and other materials will be found suitable for this purpose. It will be realized, of course, that the specific catalyst will depend upon the particular type of resin which is used. When phenolformaldehyde resin is used, for instance, it is ordinarily preferred to utilize hypophosphorous acid.

The choice of catalyst solution for use in flash setting the resin will, as in the case of the slurry catalyst, depend upon the resin being used. Thus, sodium hydroxide, hexamethylenetetramine, hydrochloric acid, or trichloroacetic acid may be used in a phenolformaldehyde system, while diethylenetriamine, triethylenetetramine, piperidine, or phthalic anhydride can be used with epoxy. Moreover, the amount of catalyst will vary, it being necessary only that sufficient catalyst is used to contact the rearward portion of the slurry injected ahead of the catalyst. In general, from about 10 to about 500 gallons of catalyst solution, and preferably from about 100 to about 300 gallons, will produce satisfactory results; although, amounts outside this range may be used if desired.

Ordinarily, the catalyst solution utilized in flash setting the slurry will not consist of catalyst alone but rather will comprise a relatively small amount of catalyst in a suitable solvent. In general the active catalyst component will represent from about 0.1 to about 50 percent of the total catalyst solution with a preferred range being from about 1 to about 5 percent. While the choice of diluent plays no major part in the present invention, it is of interest in practicing processes embodying the invention. Ordinarily, this diluent will not be of such nature as to dissolve or dilute the resin which is utilized in preparing the slurry; and it should not be reactive with any of the other components either in the well, or the formation itself or in the slurry. Thus it has been found that a variety of neutral hydrocarbon materials are satisfactory for use as a diluent although other materials may be utilized. Of the hydrocarbons specific examples include: diesel fuel, pale oil, fuel oil, crude oil, kerosene and other similar materials.

The carrier and buffer solutions used on any given job should be the same or similar materials and the choice of carrier and buffer may be undertaken from a relatively wide selection of materials. In general, these materials will necessarily be characterized by being unreactive and insoluble with the materials with which they come into contact; and the catalyst must be soluble therein so that the catalyst can diffuse through the buffer to contact the unset resin. Materials suitable for use include motor oil, pale oil, fuel oil, diesel fuel, and kerosene. Pale oil and diesel fuel are ordinarily preferred.

Example I

In order to demonstrate the effectiveness of the present invention under actual field conditions, a number of field tests have been run. Among these was a field test which was conducted in the Bayou Blue Field in Louisiana where a well producing sand and 20 API gravity crude from a formation located at the depth from about 2,000 to about 3,000 feet was treated utilizing the techniques of this invention. Initially the well was washed with lease salt water after which a bridge plug was set at 2,976 feet. Thereafter, the brine was displaced with lease crude.

The well was then shut in while the slurry was mixed at the wellhead. The slurry, which totaled 13.5 barrels in volume, consisted of 4,000 pounds of 40–60 mesh clean Ottawa sand, 225 gallons of No. 85 fuel oil, 75 gallons of No. 400 pale oil, 60 gallons of 33% phenolformaldehyde in 67% furfuryl alcohol, 7 gallons of 50% aqueous solution of hypophosphorous acid catalyst, and ½ gallon of γ-aminopropyltriethoxysilane coupling agent.

After the formation was broken down with oil at 3½ b.p.m. at a surface pressure of 600 p.s.i., 5.2 barrels of the slurry were pumped into the well at 2 b.p.m. and followed by 3 barrels of lease crude which had a viscosity of approximately 120 cp. The lease crude was in turn followed by 5 barrels of 2% trichloroacetic acid in lease crude and 22 barrels of lease crude buffer. At the end of the injection of the 22 barrels of lease crude, pumping was stopped for 15 minutes to allow the slurry to be contacted by the catalyst and set. Four and one half barrels of slurry were then injected, followed by 3 barrels of crude, 5 barrels of 2% trichloroacetic acid solution and 8.3 barrels of crude buffer. At this juncture the pressure rose to about 2000 p.s.i. which indicated sandout. This pressure was maintained for 10 minutes but it was found impossible to squeeze any more than a few gallons per minute into the lines. After 15 minutes, circulation was reversed to flush the slurry out of the tubing. Subsequently, the well was shut in for approximately 24 hours after which the casing was drilled out with a 6¼ inch bit.

Inasmuch as the sandout was obtained before the total amount of the second slug of the three-slug portion of slurry was injected, it was not possible to inject the third slug of the slurry mixture. Later this well was swabbed for one day and came in producing 180 b.w.p.d. and 2 b.p.d. with no sand.

From the foregoing description of the invention, it will be appreciated that the described process provides certain marked improvements in methods currently used for consolidating incompetent subterranean formations. Although certain specific examples have been given, it is not intended that the invention be limited to or circumscribed by the specific details of material, proportions, or conditions herein specified, since such materials, proportions and conditions may be varied or modified according to individual preference without operating outside the broad principle underlying the invention. Selection of specific compositions and the quantity thereof to be used will, as has been indicated, depend upon the problems posed by the particular formation which is to be consolidated.

Having fully described and illustrated the practice of the present invention, what I desire to claim as new and useful and to secure by Letters Patent is:

1. The method of consolidating incompetent subterranean formations which comprises the steps of:
   (a) mixing a slurry comprising a carrier, particulated material and an organic, age-hardenable resinous composition;
   (b) positioning a first fractional portion of said slurry in contact with a portion of said subterranean formation;
   (c) contacting at least a part of said portion of slurry with a catalyst to "flash set" the contacted portion; and
   (d) positioning a second fractional portion of said slurry in contact with a portion of said formation immediately adjacent the portion of the formation which is contacted by the first fractional portion of the slurry.

2. The method defined in claim 1 wherein said mixed slurry is in an amount equal to from about 0.5 to about 25 barrels per vertical foot of formation to be treated.

3. The method defined in claim 2 wherein said catalyst is of sufficient strength to set the portion of said slurry which it contacts within from about 10 to about 30 minutes from the time of contact.

4. The method defined in claim 3 wherein from about 1 to about 50 bulk unit volumes of particulated material are provided per bulk unit volume of resinous composition.

5. The method defined in claim 3 wherein from about 16 to about 35 bulk unit volumes of particulated material are provided per bulk unit volume of resinous composition.

6. The method defined in claim 5 wherein from about 0.1 to about 25 pounds of particulated material is utilized per gallon of carrier material.

7. The method defined in claim 1 wherein said particulated material is silicious sand and further characterized to include a coupling agent in the slurry mixture.

8. The method defined in claim 7 wherein said catalyst is of sufficient strength to set the portion of said slurry which it contacts within from about 10 to about 30 minutes from the time of contact.

9. The method defined in claim 8 wherein said catalyst is of sufficient strength to set the portion of said slurry which it contacts within from about 10 to about 30 minutes from the time of contact.

10. The method defined in claim 9 wherein from about 16 to about 35 bulk unit volumes of particulated material are provided per bulk unit volume of resinous composition.

References Cited

UNITED STATES PATENTS

| | | | |
|---|---|---|---|
| 2,823,753 | 2/1958 | Henderson | 166—33 X |
| 3,123,137 | 3/1964 | Young et al. | 166—33 |
| 3,176,769 | 4/1965 | Treadway et al. | 166—33 |
| 3,209,826 | 10/1965 | Young | 166—33 |
| 3,221,814 | 12/1965 | Hower | 166—33 |
| 3,282,338 | 11/1966 | Walther et al. | 166—33 |
| 3,285,339 | 11/1966 | Walther et al. | 166—33 |
| 3,297,085 | 1/1967 | Spain | 166—33 |
| 3,316,966 | 5/1967 | Dear | 166—33 |

STEPHEN J. NOVOSAD, *Primary Examiner.*